March 13, 1956  A. KORSMO ET AL  2,737,767
CROP CONVEYING AND DELIVERING MECHANISM FOR CORN HARVESTERS
Original Filed April 8, 1949  5 Sheets-Sheet 5

INVENTOR.
ALFRED KORSMO
MARTIN RONNING
BY
ATTORNEYS

United States Patent Office 2,737,767
Patented Mar. 13, 1956

2,737,767

CROP CONVEYING AND DELIVERING MECHANISM FOR CORN HARVESTERS

Alfred Korsmo, Hopkins, and Martin Ronning, St. Louis Park, Minn., assignors to Minneapolis-Moline Company, Hopkins, Minn., a corporation of Minnesota Original application April 8, 1949, Serial No. 86,175, now Patent No. 2,641,887, dated June 16, 1953. Divided and this application January 8, 1953, Serial No. 330,278

9 Claims. (Cl. 56—18)

This invention relates to improvements in mechanisms for conveying and delivering crop materials in agricultural machinery, and particularly to a conveying mechanism between a pair of crop working units, one of which moves or tilts with respect to the other.

We illustrate our invention herein in connection with a two-row corn picker having a forwardly arranged, vertically tiltable picker unit and a rearwardly arranged husking unit, and the invention is for the purpose of conveying the picked corn upwardly and rearwardly from picker to husker. The invention will be so described herein but it is to be understood that the conveyor mechanism will also be useful in conjunction with machines for harvesting crops other than corn, wherein there are a pair of relatively movable crop working units. The present application is, furthermore, a division from our co-pending application Serial No. 86,175, filed April 8th, 1949, for Row Crop Implement-Tractor Combination, now Patent No. 2,641,887, issued June 16, 1953.

The primary object of the invention is to provide a crop conveying and delivering mechanism including an endless raddle type or flighted conveyor extending from the picker unit upwardly and rearwardly to a delivery point above the husking unit, with novel connection and frame means supporting the opposite ends of the conveyor and mounting them upon the respective units, so that the conveyor will be maintained in an operatively taut condition despite the fact that the picker unit is frequently tiltably adjusted with respect to the husking unit during operation of the machine.

Another object is to provide novel mounting and supporting means for the delivery end of the conveyor to limit and prescribe its movement, as the picker unit is adjusted, so that a flexible chain drive may be used for the conveyor and so that the drive chain will also be maintained in an operatively taut condition at all times.

A further object is to provide a crop conveying mechanism of this character so arranged and provided that it will further function to assist in the discharge of waste products from the husker unit such as the husks, silks, etc.

These and other more detailed and specific objects will be disclosed in the course of the following specifications, reference being had to the accompanying drawings, in which—

Figure 1:
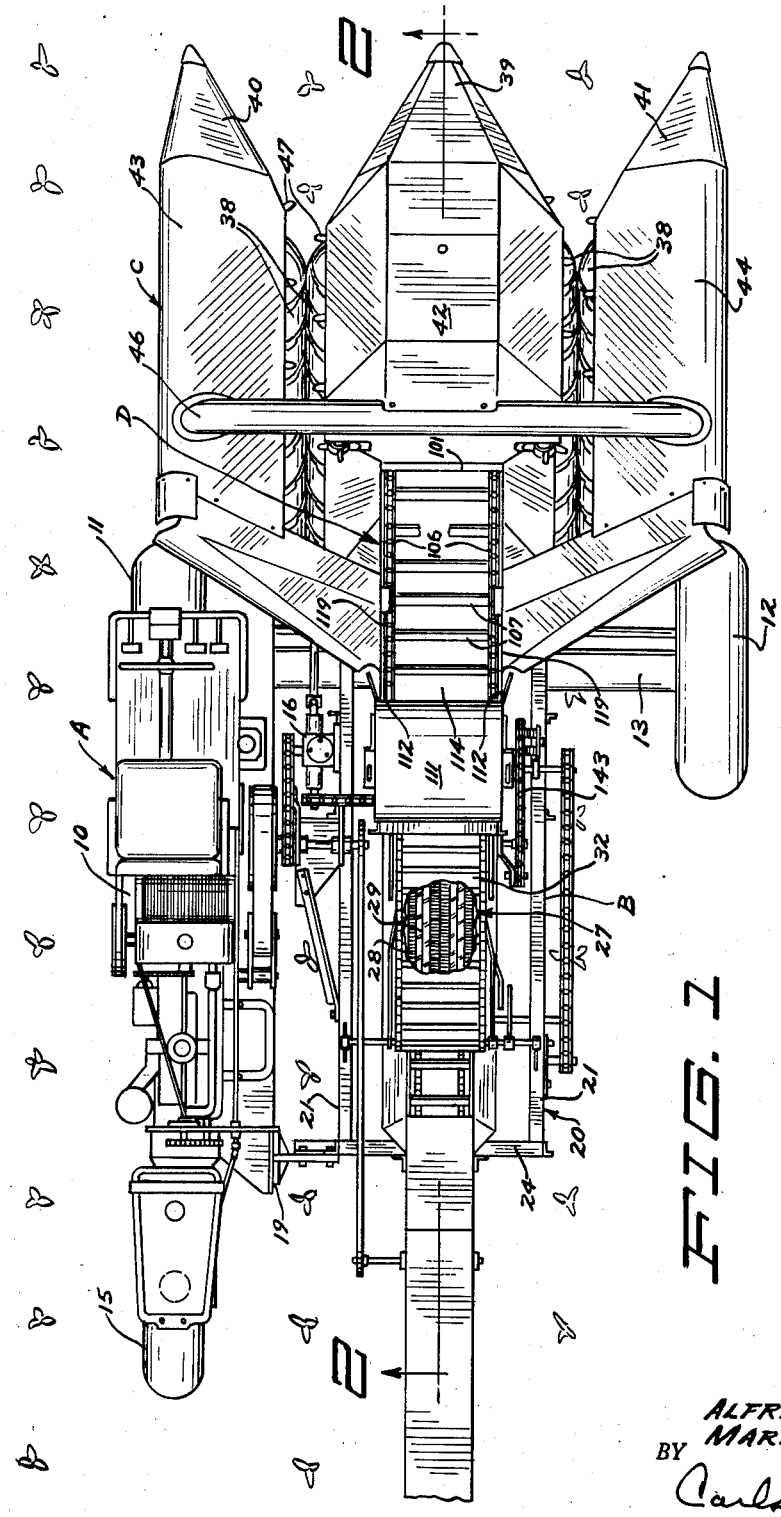
Fig. 1 is a plan view with parts broken away of a two-row, self-propelled corn picker which forms the subject matter of the parent application and in connection with which the conveying and delivering mechanism of the present invention is used.

Referring now more particularly and by reference characters to the drawing, a tractor-implement combination forming the subject matter of the parent application will be described herein with only such detail as necessary for an understanding of the present invention. In its presently illustrated form the machine is a two-row, self-propelled corn picker made up fundamentally of a tractor unit, designated generally at A, upon which there is supported a husking unit B and a forwardly located, two-row picker unit C. As will be evident from Fig. 1, it is necessary to provide means for conveying the crop from both sets of picking rolls in the unit C upwardly and rearwardly for discharge into the husker unit B, which is centrally located to the rear of the picker unit. It is this crop conveying and delivering mechanism, which is designated generally at D, that comprises the subject of the present application.

The tractor unit A includes an elongated, laterally located chassis assembly 10 upon which there is a power plant, operator's station and other related components. The tractor unit further includes a pair of widely spaced and forwardly located traction wheels 11 and 12 connected by a live axle 13 located in a tubular axle housing 14, with the axle, of course, driven from the engine in order to power the traction wheels. The rear end of the tractor is supported upon a dirigible rear wheel 15 which runs in substantial tracking alignment with the traction wheel 11. Power for actuation of the implement mounted upon the tractor is taken through a drive assembly, indicated generated at 16, and the implement is supported at three points upon the tractor, including two transversely spaced forward fastenings, designated at 17 and 18, and a single rear fastening 19. This tractor assembly, per se, is not only described and shown in more detail in the parent application but further forms the subject matter of Ronning Patent No. 2,524,083, issued October 3rd, 1950, to which attention is invited for a complete disclosure of the tractor and the implement mountings therefor.

Figure 2:
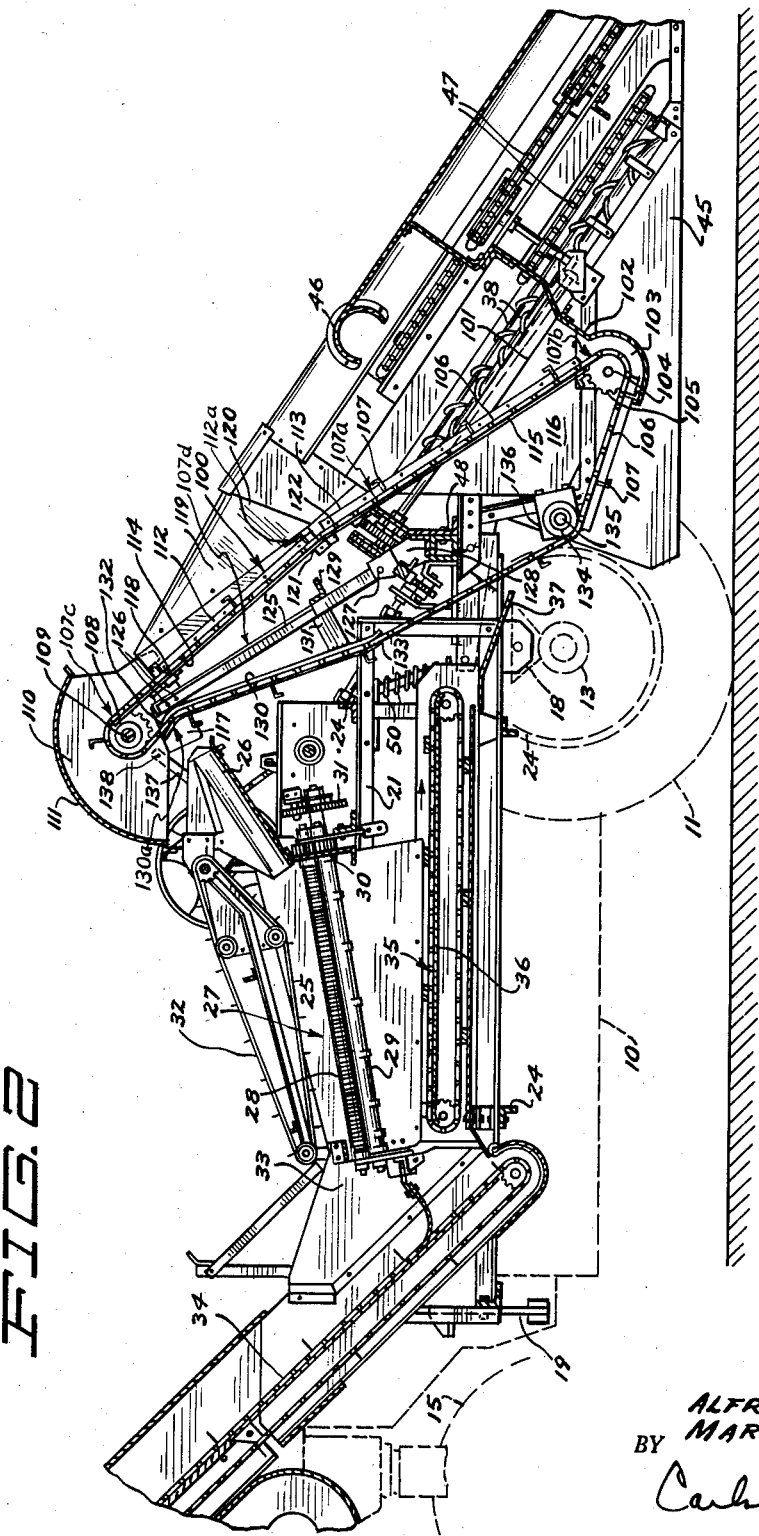
Fig. 2 is an enlarged longitudinal sectional view taken substantially along the line 2—2 in Fig. 1 and showing certain parts of the tractor portion of the implement in dotted lines only.

It is the husker unit B which is directly connected by the three fastenings 17, 18 and 19 to the tractor and this unit will first be described in detail. The same comprises a main frame structure of box-like arrangement and construction, designated generally at 20, which may be conveniently fabricated from angle iron and channels in accordance with modern production methods and which comprises, as its main elements, upper and lower frame bars 21 and 22 at each side which are connected by vertical bars, designated throughout at 23, and cross connected by transverse bars, indicated collectively at 24. Since the precise construction of this main frame does not, of course, form a part of the present invention, it will not be described in further detail and such parts as necessary will be identified hereinafter. In any event, the main frame forms a support for a husking box 25 which is open forwardly and upwardly for the reception of the picked corn, which falls upon a chute 26 directing the ears onto a husking bed 27 conventionally made up of upper and lower rolls, indicated at 28 and 29. These rolls are located lengthwise in the main frame in a rearwardly, downwardly sloping position and are driven at their forward ends by means of a series of meshing gears 30 and sprocket chains 31, as described in detail in the parent application. The ears are moved downwardly over the husking bed and held to the husking rolls by means of a husking conveyor, indicated generally at 32, and the husked ears of corn emerge at the point 33 in Fig. 2, from whence they fall onto a conventional wagon elevator 34 extending upwardly and rearwardly from the rear end of the machine to deliver the ears to the wagon or truck which usually accompanies the picker. The husks and silks stripped from the ears by the husking rolls fall through the bed onto a horizontally arranged endless apron-type husk conveyor 35 located beneath the husking box, as best seen in Fig. 2. This husk conveyor 35 is driven so that its upper flight, designated at 36, moves in a forward direction and the husks thus are discharged over an apron or lip 37 at a point immediately forward of the axle housing 14 and fall to the ground. It is not believed necessary to further describe the husker unit or the various drive mechanisms for its rolls and conveyors herein.

Figure 3:
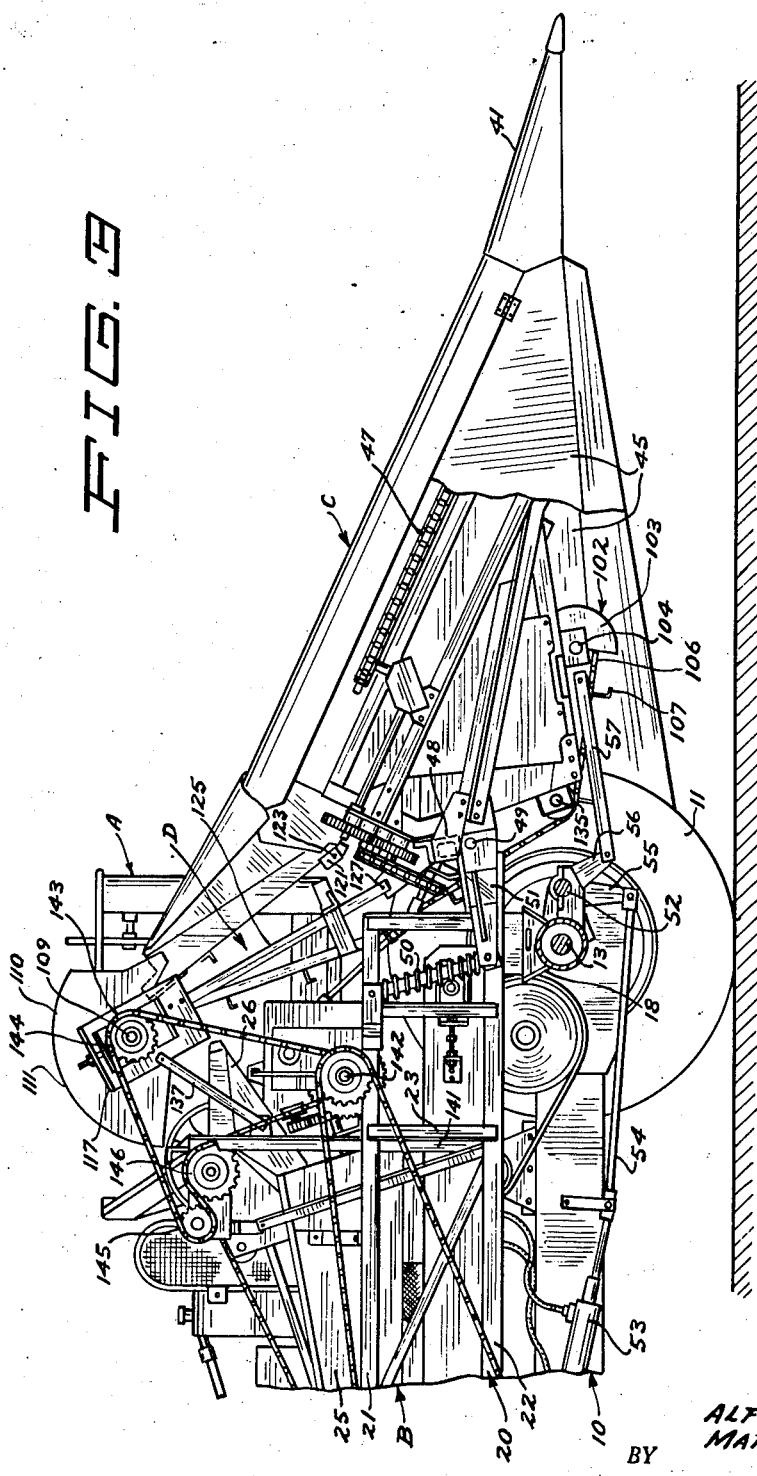
Fig. 3 is a side elevation of the forward portion of the machine partially broken away to disclose interior details of construction and showing the picker unit as adjusted upwardly to an elevated position with respect to its position in Fig. 2.

The picker unit C is, as stated, designed for picking two rows of corn simultaneously and for this purpose it, of course, has right and left hand pairs of picking rolls and opposed cooperating upper and lower gathering chains in accordance with the usual construction of such devices. The corn is guided and directed into the rolls 38 by means of a forwardly tapering center snout 39 and laterally disposed oppositely flaring gathering points 40 and 41. The snout extends rearwardly into a center sheet 42, the opposite surfaces of which slope toward the rolls 38 while the gathering points extend rearwardly into gathering sheets 43 and 44, also sloping toward the rolls. The gathering sheets further have depending side panels, indicated at 45, and this entire structure is conventionally fabricated from suitably braced and supported heavy sheet material including the usual tubular cross member 46. The framing for the picker unit, including the snapping rolls 38, as well as the gathering chains 47, includes a tubular cross member or hollow beam 48 and the same is rigidly connected to the frame structure of the picker unit by suitable brackets and gusset plates, as clearly shown. Inasmuch as the picker unit must be vertically adjusted to compensate for varying conditions of the crop being harvested, the connection between the frame structure of the picker unit and the main frame 20 of the machine is made by means of heavy pivot pins, designated at 49, about which the picker unit may swing in a vertical, longitudinal plane. Heavy coil springs 50 are connected between the main frame 20 and rearward extensions 51 of the picker unit frame, in order to counterbalance the weight of the picker unit. As best seen in Fig. 3 the picker unit is vertically adjusted by means of a rock shaft 52 carried by suitable bearing brackets on the axle housing 14 and rocked by means of a hydraulic ram 53 connected by a link 54 to an arm 55 on the shaft. Other arms 56 on the shaft are then connected by links 57 to a lower point on the picker frame so that oscillation of the rock shaft will vertically position the picker.

Figure 4:
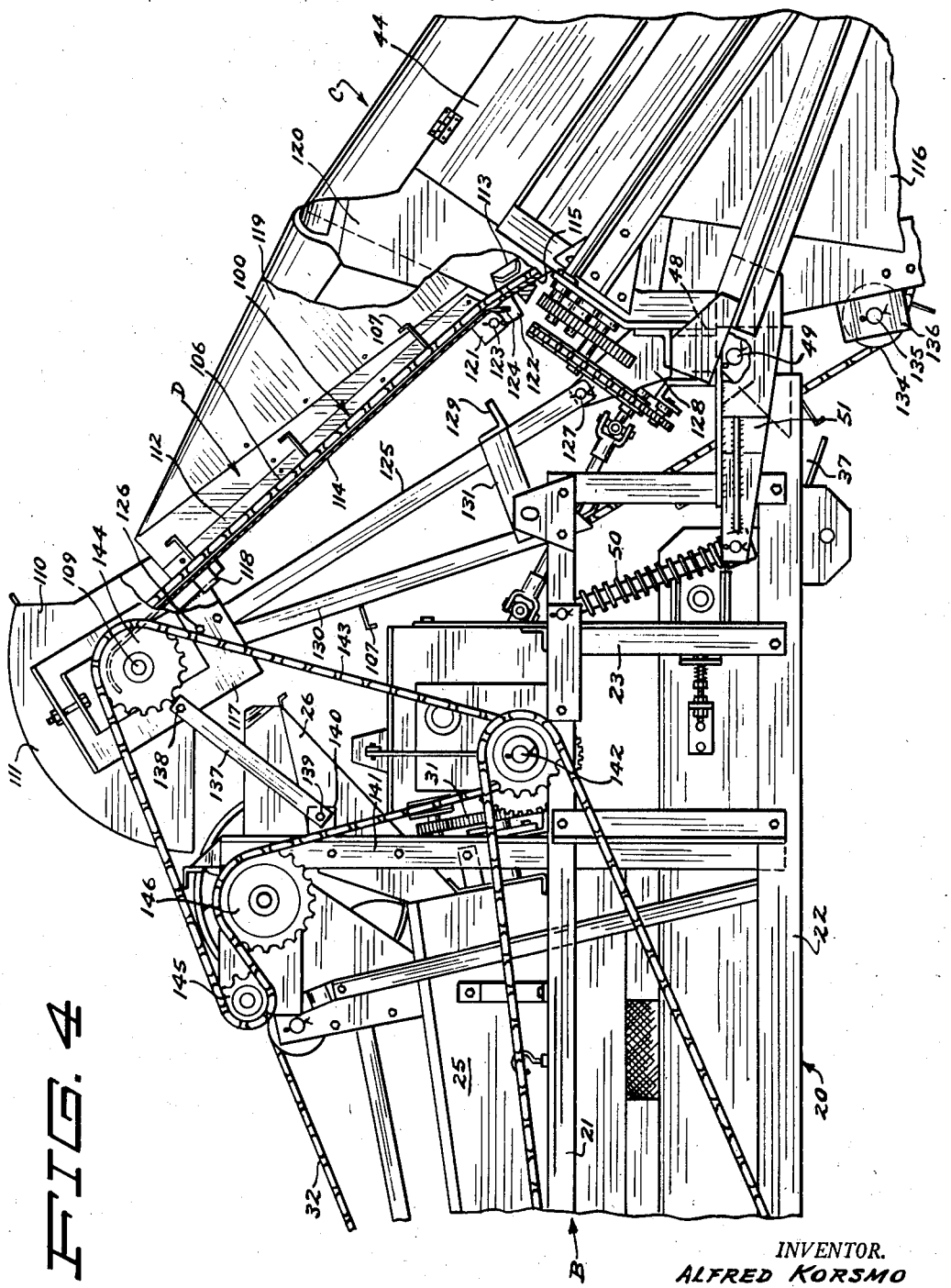
Fig. 4 is an enlarged side elevation of a central portion of the machine with certain parts broken away and in section and showing the crop conveying and delivering mechanism constituting the present invention.
Figure 5:
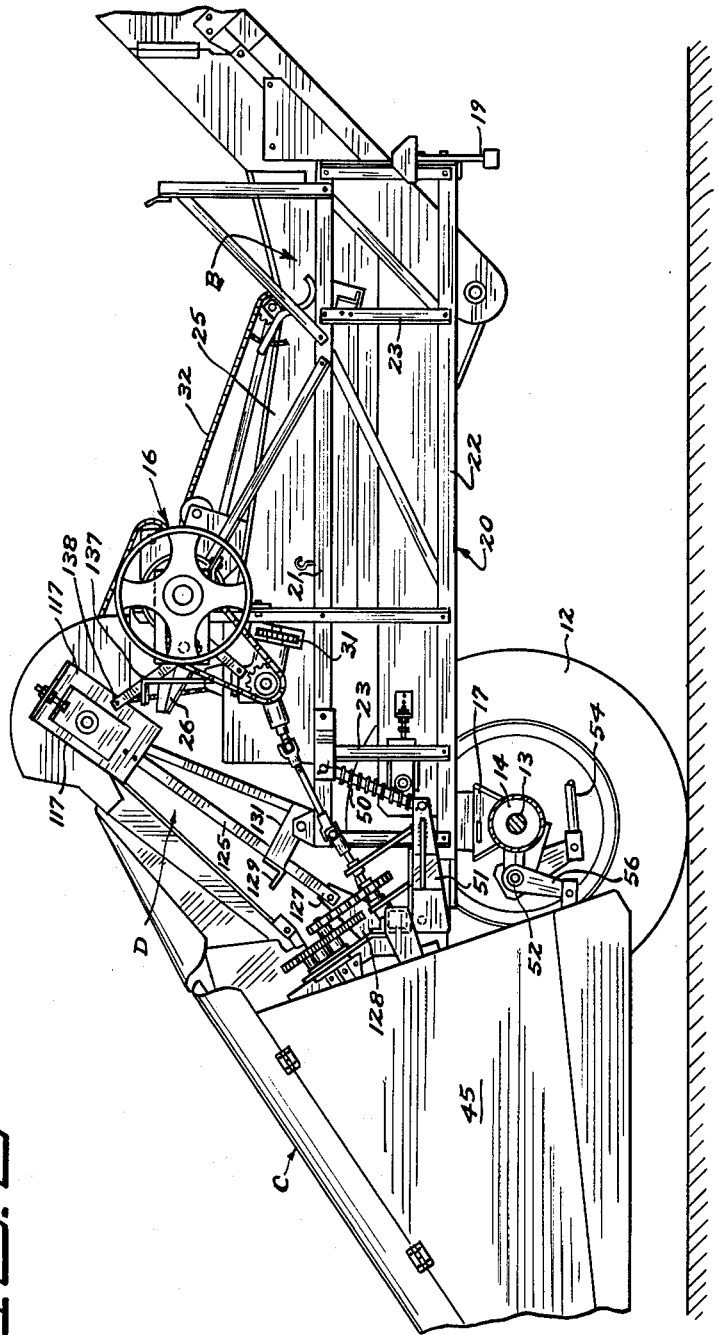
Fig. 5 is a side elevation of the central portion of the machine, looking at the same from the opposite side, and with the front axle structure of the tractor shown in section.

It is, of course, necessary to elevate the ears of corn snapped by the rolls 38 upwardly and rearwardly in order that the ears may be properly delivered to the chute 26 of the husker unit, and for this purpose we provide an ear conveying and delivery mechanism, designated generally at 100, forming the basis of the present invention and which will now be described in detail. Referring to Fig. 2 it will be noted that there is an opening 101 between the upper rear end portions of the picking rolls into which the snapped ears will be delivered by the gathering chains and the action of the rolls, and below such opening there is what may be referred to as a well 102 for the reception of the ears. This well includes a housing suitably carried by the frame of the picker unit, having sides 103 through which there is journaled a shaft 104 carrying tail sprockets 105, over which operate transversely spaced conveyor chains 106. These chains 106 are connected by a series of transverse raddles or flights, indicated throughout at 107, forming an ear conveyor designated generally at 107$^a$, extending upwardly and rearwardly, having a forward, lower receiving end 107$^b$ and an upper rear delivery end 107$^c$, as clearly shown and so designated in Fig. 2. At this upper rear end 107$^c$ of the conveyor the chains 106 operate over head or drive sprockets 108 carried by a shaft 109 which is mounted through the sides 110 of a bonnet 111 and between these head and tail sprockets the forward flights of the chains are guided by upper and lower angle iron guides 112 and 113. Said guides are connected by upper and lower, transversely extending flat sheets 114 and 115 and the arrangement is thus obviously such that the raddles 107, moving upwardly over these sheets, will engage and elevate the snapped ears of corn from the well 102 and will deliver the ears through the bonnet 111 to the chute 26. The lower guides 113 are welded or otherwise suitably secured to side panels 116, which form the sides of the aforesaid opening 101 between the rear end portions of the snapping rolls, whereas the upper guide bars are secured to stiffener plates 117 by means of clips 118, the said stiffener plates being attached to the opposite sides 110 of the bonnet 111. The upper guides 112 are also welded or otherwise suitably secured to opposed conveyor troughs 119 extending downwardly and forwardly to prevent the unwanted lateral escape of the corn, and these troughs extend loosely at 120 into the upper rear portions of the side panels 45 to permit flexing at this point as the picker is raised and lowered. It is also to be noted that the lower ends 112$^a$ of the upper guides 112 are provided with bracket ears 121 which overlap similar ears 122 at the upper ends of the lower guides 115 and which ears are pivotally connected by pins 123. Thus this forward apron or "bottom" structure made up of the guides and sheets 114—115 for the conveyor may flex about the pivots 123 and for this purpose the upper end of the lowermost sheet 106 loosely overlies a lip 124 at the lower edge of the uppermost sheet 114, as best seen in Fig. 4.

The bonneted upper discharge end of the conveyor 107$^a$ is supported upon a conveyor frame structure designated generally at 107$^d$ in Fig. 2 upon the upper ends of side or support links or swingable members 125 located one at each side of the assembly and secured at their upper ends at 126 to the side plates 117. From this point the side links 125 angle downwardly and forwardly and at their lower ends they are pivotally connected by pins 127 to brackets 128 secured in properly spaced relation to the aforesaid cross beam 48. Adjacent these pivoted lower ends the side links 125 are rigidly cross connected by a bar 129 in order to move as a unit about the axes of the pins 127 in a longitudinal vertical plane as the picker unit is raised and lowered. The upper portions of the downwardly moving rear flights of the chains 106 are supported by lateral guide bars 130 secured at their upper ends 130$^a$ to the inner surfaces of the side plates 117 and extending downwardly in rearwardly diverging relation, with respect to the side links 125, to a point between the forward ends of the upper frame bars 21. These guide bars 130 are made up from angle-irons with inwardly turned webs located to the rear of the chains in guiding relation thereto, and they are secured by tie bars 131 to the aforesaid side links 125 to move as a unit therewith. At their upper extremities 132 the guide bars 130 curve upwardly and rearwardly to receive the chains as they run off the undersides of the head sprockets 108 and at their lower ends the guides 130 have clips 133 which curve downward and forward to guide the rear flights of the chains as they angle in a corresponding direction downward beneath idler sprockets 134. Said idler sprockets are located on a shaft 135 carried by brackets 136, secured to the picker unit frame, and the chains 106 run underneath the idler sprockets and then forwardly beneath the tail sprockets 105 as clearly seen.

In addition to this supporting assembly the bonneted discharge end of the conveyor mechanism is also swingably supported from the husker unit by means of a pair of laterally disposed tie bars, links or swingable members 137 which are pivoted at upper ends 138 to the side plates 117 and extend downwardly and rearwardly therefrom. The rear ends of these tie bars 137 are then pivoted at 139 to suitable brackets 140 guided by upright frame bars 141 secured to and forming a part of the main frame assembly 20.

The conveyor mechanism 100 is driven by a suitable sprocket upon a drive shaft 142, actually a countershaft forming part of the over-all drive system, which is journaled transversely of the main frame 20 and is itself suitably operated off the drive mechanism 16, as described in detail in the parent application. The drive connection from this shaft to the conveyor is made by means of a drive chain 143 which operates over a sprocket 144 secured to one end of the head sprocket shaft 109, as best seen in Fig. 4. This chain 143 also operates over a rearwardly located idler sprocket 145 and over a drive sprocket 146 which forms a part of the drive mechanism for the husking conveyor 32. It will be noted that the drive for the chain 143 is thus located downwardly and rearwardly with respect to the head end of the conveyor mechanism, as are also the pivoted ends 139 of the tie bars 137.

The operation of the conveying mechanism as such will, it is believed, be readily understood. The chains 106 travel upwardly on their forward spans so that the flights or raddles 107 will convey and elevate the snapped ears of corn from the well 102 between the rolls 38 upward through the bonnet 111 and into the chute 26. It is necessary that the conveying mechanism permit the vertical adjustment of the picker unit C, of course, and also that this movement be permitted without substantial movement of the upper discharge end of the conveyor so that the ears will at all times properly fall into the chute for delivery onto the husking bed. If the conveyor were simply connected to move as a unit with the picker unit, the movement at the upper end would be too great, and it is to be noted that this upper end of the conveying mechanism is accordingly connected to both the picker and husker units. Furthermore, it is necessary that the conveyor chains 106, as well as the drive chain 143, be maintained in a properly taut condition at all times. In describing the operation of the various supporting and guiding parts of the conveying mechanism it will be assumed first of all that the picker unit is in its lowered position of Fig. 2, and it will then be evident that the upward movement of the picker unit, toward or beyond the position of Fig. 3, will tend to project the entire conveyor mechanism in an upward and rearward direction. This movement is transmitted to the head or discharge end of the conveyor through the side or support links 125, but the resulting travel of the head into the conveyor is limited and prescribed by the action of the tie bars 137, the upper ends 138 of which will travel an arcuate path on radii centered at the pivots 139. Inasmuch as the latter pivots 139 are located rearwardly and downwardly with respect to the head sprocket shaft 109, as is also the drive shaft 142 for the chain 143, this arcuate motion of the upper end of the conveyor will have no appreciable effect upon the tautness of the chain 143, and it will at all times operatively drive the various sprockets. Furthermore, it will be understood that since the entire conveyor system and the side links 125 by which it is supported and held upwardly are closely related to the axes of the pins 49 upon which the picker unit swings, the aggregate motion of the conveyor mechanism will be relatively slight. As this motion takes place the upper and lower sheets 114 and 115 also must flex to some degree, and this is provided for by the pivot connection 123 between the guides and the loosely overlapping relation of the respective lower and upper ends of the sheets 114—115. The side or support links 125 of course function to hold the conveyor chains 106 taut at all times and the pivot connections 127 of these links to the picker unit frame provides for the necessary component or forward and rearward motion of the upper end of the conveying mechanism, which motion is in turn confined and prescribed by the tie bars 137 in order to keep the drive chain 143 taut as previously described.

It is to be noted in both Figs. 2 and 4 that the downwardly moving rear spans of the conveyor chains 106 pass just forwardly of the lip 37 over which the husks, silks, etc., are delivered and discharged from the husking unit by the conveyor 35. Difficulty is often encountered in machines of ordinary construction due to the discharge point for the husks becoming clogged, but in our machine the flights or raddles 107 on the conveyor chains 106 operate very effectively to grasp and pull the husks out and down as they fall from the forward end of the conveyor 35 and thus the conveying mechanism has the further function of positively and mechanically discharging the husks so that they cannot become clogged up upon the delivery lip 37, as will be readily appreciated.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For use in a corn picker having a forwardly located picking unit supported for up and down adjustments and a rearwardly located husking unit, the improvement which comprises an ear conveyor having a forward end and an upper rear end and extending upwardly and rearwardly from the picking unit to the husking unit, means mounting the conveyor at its lower forward end on the picking unit, and separate swingable members connecting the upper rear end of the conveyor to both the picking and husking units.

2. For use in a corn picker having a forwardly located picking unit supported for up and down adjustments and a rearwardly located husking unit, the improvement which comprises an ear conveyor having a lower forward end and an upper rear end and extending upwardly and rearwardly from the picking unit to the husking unit, means mounting the conveyor at its lower forward end on the picking unit, and a swingable member pivoted at a lower end to the picking unit and extending upward and connected at its upper end to the upper end of the conveyor, and a separate swingable member pivoted at a lower end to the husking unit and extending upwardly and forwardly to the upper end of the conveyor and pivoted thereto.

3. For a corn picker having a husking unit and a forwardly located picking unit pivoted for up and down swinging adjustments with respect to the husking unit, the improvement which comprises an ear conveyor assembly for conveying ears from a lower receiving point on the picking unit upwardly and rearwardly to an upper discharge point above the husking unit and comprising a conveyor having a lower receiving end and an upper delivery end, means operatively supporting the receiving end of the conveyor on the picking unit and means extending between the picking unit and the delivery end of the conveyor to cause the conveyor to move bodily upward and downward as the picking unit is correspondingly adjusted, and means also swingably connecting the delivery end of the conveyor to the husking unit to confine and prescribe movement of this end of the conveyor with respect to the husking unit.

4. For a corn picker having a husking unit and a forwardly located picking unit pivoted for up and down swinging adjustments with respect to the husking unit, the improvement which comprises an ear conveyor assembly for conveying ears from the picking unit upwardly and rearwardly to the husking unit and comprising a conveyor having a lower receiving end and an upper delivery end, means operatively supporting the receiving end of the conveyor on the picking unit, a conveyor frame structure located between the receiving and delivery ends of the conveyor and supported on the picking unit to move the conveyor bodily upward and downward as the picking unit is correspondingly adjusted and thereby maintain the conveyor in an operatively taut condition, the said conveyor frame structure having pivots located between the receiving and delivery ends of the conveyor and said pivots permitting movements of the delivery end also forward and rearward with respect to the husking unit, and means pivotally connected between the delivery end of the conveyor and the husking unit and prescribing the said movements of the conveyor at its delivery end.

5. For a corn picker having a husking unit and a forwardly located picking unit pivoted for up and down swinging adjustments with respect to the husking unit, the improvement which comprises an ear conveyor assembly for conveying ears from the picking unit upwardly and rearwardly to the husking unit and comprising a conveyor having a lower receiving end and an upper delivery end, means operatively supporting the receiving end of the conveyor on the picking unit, a conveyor frame structure located between the receiving and delivery ends of the conveyor and supported on the picking unit to move the conveyor bodily upward and downward as the picking unit is correspondingly adjusted and thereby maintain the conveyor in an operatively taut condition, means pivoting the conveyor frame structure to the picking unit whereby the delivery end of the conveyor will swing in forward and rearward directions, and tie bars pivoted between the delivery end of the conveyor and points located rearwardly and downwardly therefrom upon the husking unit.

6. For a corn picker having a husking unit and a forwardly located picking unit pivoted for up and down swinging adjustments with respect to the husking unit, the improvement which comprises an ear conveyor assembly for conveying ears from the picking unit upwardly and rearwardly to the husking unit and comprising a conveyor having a lower receiving end and an upper delivery end, means operatively supporting the receiving end of the conveyor on the picking unit, a conveyor frame structure extending upwardly and downwardly between the receiving and delivery ends of the conveyor and supported at its lower end on the picking unit to move the conveyor bodily upward and downward and keep it taut as the picking unit is accordingly adjusted, the said conveyor frame structure having pivot means located between the receiving and delivery ends of the conveyor and said pivot means permitting swinging movements of the delivery end forward and rearward with respect to the husking unit, and tie bars connected between the delivery end of the conveyor and points rearward thereof upon the husking unit for limiting such swinging movements of the delivery end of the conveyor.

7. For a corn picker having a husking unit and a forwardly located picking unit pivoted for up and down swinging adjustments with respect to the husking unit, the improvement which comprises an ear conveyor assembly for conveying ears from the picking unit upwardly and rearwardly to the husking unit and comprising a conveyor having a lower receiving end and an upper delivery end, means operatively supporting the receiving end of the conveyor on the picking unit, a conveyor frame structure extending downwardly from the delivery end of the conveyor and supported at its lower end on the picking unit whereby to move the conveyor bodily upward and downward as the picking unit is accordingly adjusted, the said conveyor frame structure having pivots located between the receiving and delivery end of the conveyor and said pivots permitting swinging movements of the delivery end of the conveyor forward and rearward with respect to the husking unit, drive means for the conveyor including a shaft adjacent the delivery end thereof, a drive shaft on the husking unit, an endless flexible drive element connecting the shafts, and tie means swingably connected between the delivery end of the conveyor and the husking unit and limiting and prescribing the swinging movements of said delivery end to maintain said drive element in an operatively taut condition in all positions of the conveyor and picking unit.

8. For a corn picker having a husking unit and a forwardly located picking unit pivoted for up and down swinging adjustments with respect to the husking unit, the improvement which comprises an ear conveyor having a lower receiving end at the picking unit and an upper delivery end at the husking unit, means operatively supporting the receiving end of the conveyor on the picking unit, a conveyor frame structure extending downwardly from the delivery end of the conveyor and supported at its lower end on the picking unit whereby to move the conveyor bodily upward and downward as the picking unit is accordingly adjusted, the said conveyor frame structure having pivots located between the receiving and delivery end of the conveyor and said pivots permitting swinging movements of the delivery end of the conveyor forward and rearward with respect to the husking unit, drive means for the conveyor including a shaft adjacent the delivery end thereof, a drive shaft on the husking unit, an endless flexible drive element connecting the shafts, and tie bars pivoted at the delivery end of the conveyor and extending therefrom in the general direction of the drive shaft on the husking unit and pivoted to the husking unit to confine the said swinging movements of the conveyor's delivery end to an arc whereby the drive element will be maintained in an operatively taut condition.

9. For a corn picker having a husking unit and a forwardly located picking unit pivoted for up and down swinging adjustments with respect to the husking unit, the improvement which comprises an ear conveyor having a lower receiving end at the picking unit and an upper delivery end at the husking unit, means operatively supporting the receiving end of the conveyor on the picking unit, a conveyor frame structure extending downwardly from the delivery end of the conveyor and supported at its lower end on the picking unit whereby to move the conveyor bodily upward and downward as the picking unit is accordingly adjusted, the said conveyor frame structure having pivots located between the receiving and delivery end of the conveyor and said pivots permitting swinging movements of the delivery end of the conveyor forward and rearward with respect to the husking unit, tie bars pivoted to the delivery end of the conveyor and to the husking unit to prescribe the swinging movements of the conveyor, and said conveyor also having upper and lower guides and connecting upper and lower sheets, and the guides being pivoted together at their adjacent ends, and the sheets loosely overlapped to flex as the delivery end of the conveyor swings.

References Cited in the file of this patent

UNITED STATES PATENTS

| Number | Name | Date |
|---|---|---|
| 1,121,740 | Markham | Dec. 22, 1914 |
| 1,666,796 | Shuler | Apr. 17, 1928 |
| 1,840,336 | Threewits et al. | Jan. 12, 1932 |
| 1,945,119 | Metcalf | Jan. 30, 1934 |
| 2,223,704 | Powell | Dec. 3, 1940 |
| 2,427,861 | Johnson | Sept. 23, 1947 |